(12) United States Patent
Dong et al.

(10) Patent No.: US 11,989,144 B2
(45) Date of Patent: May 21, 2024

(54) CENTRALIZED INTERRUPT HANDLING FOR CHIPLET PROCESSING UNITS

(71) Applicant: Advanced Micro Devices, Inc., Santa Clara, CA (US)

(72) Inventors: HaiKun Dong, Beijing (CN); ZengRong Huang, Shanghai (CN); Ling-Ling Wang, Santa Clara, CA (US); MinHua Wu, Shanghai (CN); Jie Gao, Shanghai (CN); RuiHong Liu, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/389,994

(22) Filed: Jul. 30, 2021

(65) Prior Publication Data

US 2023/0034539 A1 Feb. 2, 2023

(51) Int. Cl.
*G06F 13/24* (2006.01)
(52) U.S. Cl.
CPC .................................. *G06F 13/24* (2013.01)
(58) Field of Classification Search
CPC .......... G06F 13/24; G06F 13/14; G06F 13/20; G06F 13/32
See application file for complete search history.

(56) References Cited

U.S. PATENT DOCUMENTS

| | | | |
|---|---|---|---|
| 5,222,215 A | 6/1993 | Chou et al. | |
| 5,892,957 A | 4/1999 | Normoyle et al. | |
| 6,219,743 B1 | 4/2001 | Kennel et al. | |
| 6,622,193 B1 | 9/2003 | Avery | |
| 7,000,051 B2 | 2/2006 | Armstrong et al. | |

(Continued)

OTHER PUBLICATIONS

"Chapter 9: Advanced Programmable Interrupt Controller (APIC)", Intel® 64 and IA-32 Architectures Software Developer's Manual vol. 3A: System Programming Guide, Part 1, Order No. 253668-029US, Intel Corporation, Nov. 2008, 68 pages, https://kib.kiev.ua/x86docs/Intel/SDMs/253668-029.pdf. [Retrieved Jan. 12, 2022].

(Continued)

*Primary Examiner* — Henry Tsai
*Assistant Examiner* — Kim T Huynh
(74) *Attorney, Agent, or Firm* — Kowert, Hood, Munyon, Rankin & Goetzel, P.C.; Rory D. Rankin

(57) ABSTRACT

Systems, apparatuses, and methods for implementing a centralized interrupt controller to aggregate interrupts generated across multiple semiconductor dies are disclosed. A system includes multiple interrupt sources on multiple semiconductor dies. A centralized interrupt controller on one of the semiconductor dies receives and aggregates interrupts from the multiple interrupt sources on the multiple semiconductor dies. This facilitates a single transmission point for forwarding the interrupts to the processor and operating system responsible for handling interrupts. Each interrupt source embeds an ID when conveying an interrupt to the interrupt controller. This allows the interrupt controller to differentiate between the interrupt sources and to identify which source generated a given interrupt. The interrupt controller conveys an indication of the source of the interrupt to the processor when forwarding the interrupt to the processor.

20 Claims, 13 Drawing Sheets

(56) References Cited

U.S. PATENT DOCUMENTS

| | | |
|---|---|---|
| 7,130,949 B2 | 10/2006 | Belmar et al. |
| 7,209,994 B1 | 4/2007 | Klaiber et al. |
| 7,222,203 B2 | 5/2007 | Madukkarumukumana et al. |
| 7,281,075 B2 | 10/2007 | Armstrong et al. |
| 7,380,041 B2 | 5/2008 | Belmar et al. |
| 7,546,406 B2 | 6/2009 | Armstrong et al. |
| 7,552,236 B2 | 6/2009 | Greenfield et al. |
| 7,689,747 B2 | 3/2010 | Vega et al. |
| 7,707,341 B1 | 4/2010 | Klaiber et al. |
| 7,873,770 B2 | 1/2011 | Hummel et al. |
| 7,945,905 B2 | 5/2011 | Kumar et al. |
| 8,055,827 B2 | 11/2011 | Serebrin et al. |
| 8,180,944 B2 | 5/2012 | Serebrin et al. |
| 8,234,429 B2 | 7/2012 | Serebrin |
| 8,234,432 B2 | 7/2012 | Serebrin |
| 8,489,789 B2 | 7/2013 | Serebrin et al. |
| 9,563,588 B1 * | 2/2017 | Marty ................ G06F 13/24 |
| 2004/0117532 A1 | 6/2004 | Bennett et al. |
| 2004/0205272 A1 | 10/2004 | Armstrong et al. |
| 2004/0215860 A1 | 10/2004 | Armstrong et al. |
| 2005/0125580 A1 | 6/2005 | Madukkarumukumana et al. |
| 2005/0228921 A1 | 10/2005 | Sethi et al. |
| 2006/0075146 A1 | 4/2006 | Schoinas et al. |
| 2006/0212607 A1 | 9/2006 | Riethmuller |
| 2008/0015712 A1 | 1/2008 | Armstrong et al. |
| 2008/0114916 A1 | 5/2008 | Hummel et al. |
| 2008/0162762 A1 * | 7/2008 | Neiger ................ G06F 13/24 710/261 |
| 2010/0023666 A1 | 1/2010 | Mansell et al. |
| 2010/0223611 A1 | 9/2010 | Mahalingam et al. |
| 2011/0197004 A1 | 8/2011 | Serebrin et al. |
| 2014/0115198 A1 * | 4/2014 | White ................ G06F 13/26 710/48 |
| 2014/0201406 A1 * | 7/2014 | Balakrishnan ........ G06F 1/3203 710/316 |
| 2017/0315944 A1 * | 11/2017 | Mayer ................ G06F 13/24 |
| 2018/0293690 A1 * | 10/2018 | Ray .................... G06F 12/0831 |
| 2020/0387208 A1 * | 12/2020 | Tsien ................ G06F 1/3287 |
| 2021/0117351 A1 * | 4/2021 | Wei .................... G06F 13/24 |

OTHER PUBLICATIONS

Non-Final Office Action in U.S. Appl. No. 12/611,595, dated Dec. 17, 2010, 11 pages.
International Search Report and Written Opinion in International Application No. PCT/US2010/022111, dated Jun. 9, 2010, 10 pages.
Non-Final Office Action in U.S. Appl. No. 12/611,595, dated May 27, 2011, 7 pages.
Non-Final Office Action from U.S. Appl. No. 12/611,622, dated Dec. 16, 2011, 9 pages.
International Search Report and Written Opinion in International Application No. PCT/US2022/036995, dated Nov. 3, 2022, 10 pages.

* cited by examiner

| Physical Initiator ID 710 | Logical Initiator ID 720 |
|---|---|
| 710A | 720A |
| ... | ... |
| 710N | 720N |

| Logical Initiator ID 810 | Guest OS ID 820 |
|---|---|
| 810A | 820A |
| ... | ... |
| 810N | 820N |

905
Receive, by a Centralized Interrupt Controller, a Plurality of Interrupts from a Plurality of Interrupt Sources on a Plurality of Semiconductor Dies

910
For Each Received Interrupt, Determine which Source Generated the Interrupt

915
For Each Received Interrupt, Forward the Interrupt along with an Indication of the Source to a Processor

920
Process, by the Processor, the Interrupt and Convey a Response to the Interrupt Controller when Processing of the Interrupt has been Completed

925
Forward the Completion Indication to the Interrupt Source

CENTRALIZED INTERRUPT HANDLING FOR CHIPLET PROCESSING UNITS

BACKGROUND

Description of the Related Art

Computing devices such as mobile phones, personal digital assistants (PDAs), digital cameras, portable players, gaming, and other devices requires the integration of more performance and features into increasingly smaller spaces. As a result, the density of processor dies and number of dies integrated within a single integrated circuit (IC) package have increased. Some conventional multi-chip modules include two or more semiconductor chips mounted side-by-side on a carrier substrate or in some cases on an interposer (so-called "2.5D") that is, in-turn, mounted on a carrier substrate.

BRIEF DESCRIPTION OF THE DRAWINGS

The advantages of the methods and mechanisms described herein may be better understood by referring to the following description in conjunction with the accompanying drawings, in which:

FIG. 7 is a diagram of one implementation of a master interrupt controller mapping table.

FIG. 8 is a diagram of one implementation of a CPU mapping table.

FIG. 9 is a generalized flow diagram illustrating one implementation of a method for operating a centralized interrupt controller for multiple semiconductor dies.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a centralized interrupt controller to aggregate interrupts generated across multiple semiconductor dies are disclosed herein. In one implementation, a system includes multiple interrupt sources on multiple semiconductor dies. A centralized interrupt controller on one of the semiconductor dies receives and aggregates interrupts from the multiple interrupt sources on the multiple semiconductor dies. This facilitates a single transmission point for forwarding the interrupts to the processor and operating system responsible for handling interrupts. Each interrupt source embeds an ID when conveying an interrupt to the interrupt controller. This allows the interrupt controller to differentiate between the interrupt sources and to identify which source generated a given interrupt. The interrupt controller conveys an indication of the source of the interrupt to the processor when forwarding the interrupt to the processor.

Figure 1:
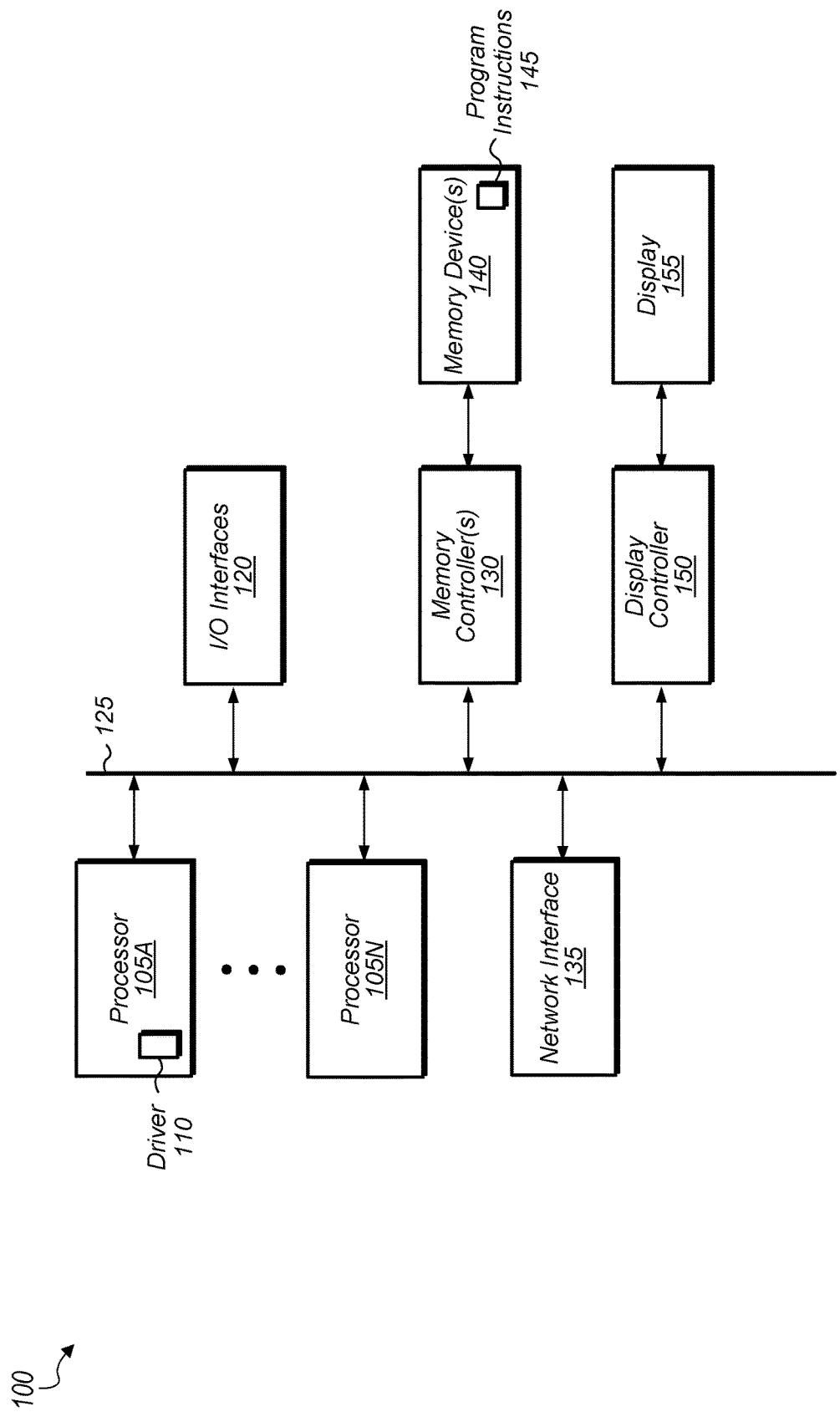
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a chiplet graphics processing unit (GPU) which processes data, executes parallel processing workloads, renders pixels for display controller 150 to drive to display 155, and/or executes other workloads.

A chiplet GPU is a complex integrated circuit that performs graphics-processing tasks across multiple semiconductor dies. For example, a GPU executes graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for a meta-app, a second set of program instructions for a driver component, and so on. Alternatively, program instructions 145 can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
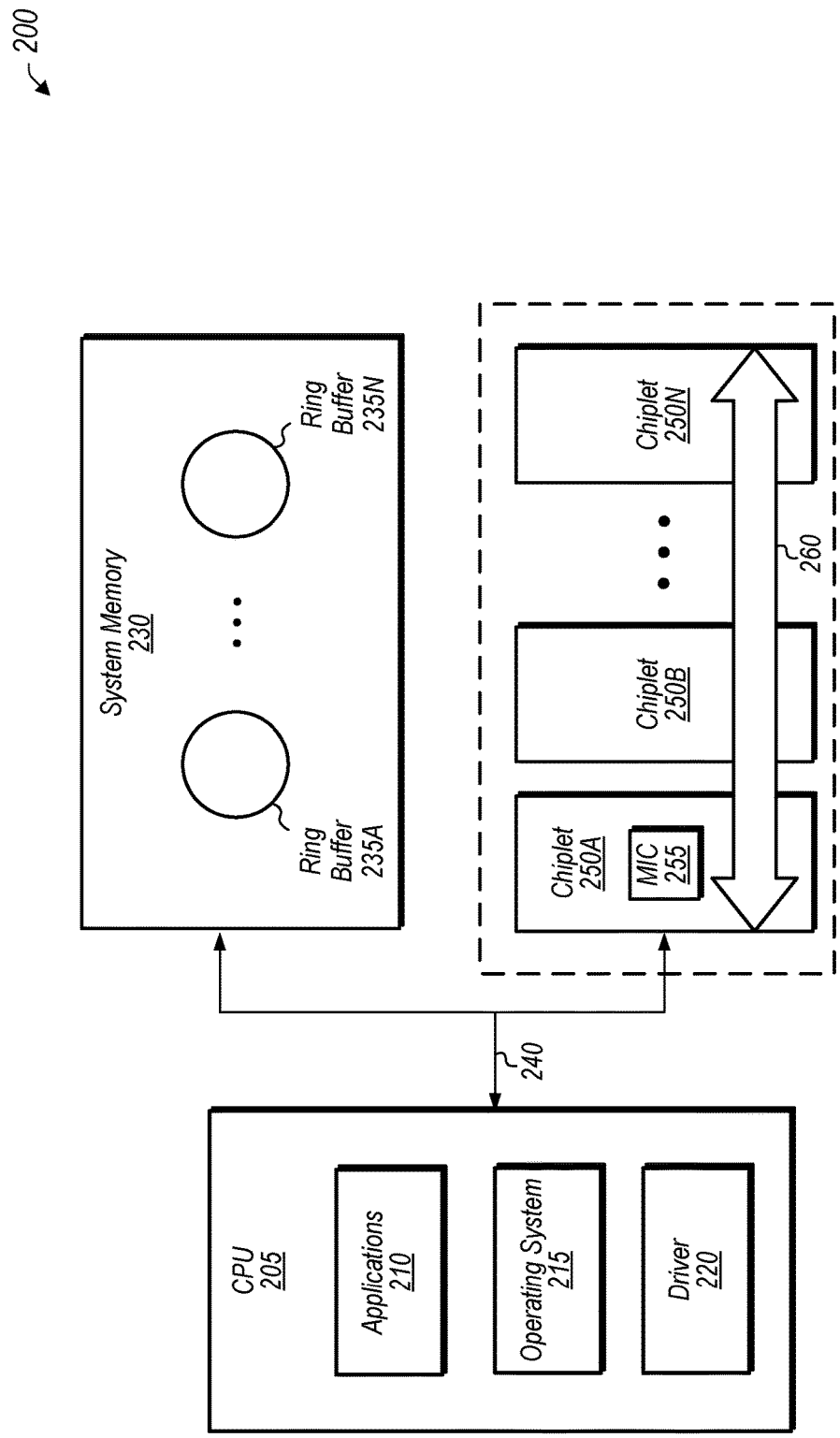
FIG. 2 is a block diagram of a processing system employing GPU chiplets in accordance with some implementations.

Turning now to FIG. 2, a block diagram illustrating a processing system 200 employing GPU chiplets in accordance with some implementations is shown. In the depicted example, the system 200 includes a central processing unit (CPU) 205 for executing instructions and an array of one or more GPU chiplets, such as GPU chiplets 250A, 250B, and through 250N (collectively, GPU chiplets 250). In various implementations, and as used herein, the term "chiplet" refers to any device including, but is not limited to, the following characteristics: 1) a chiplet includes an active silicon die containing part of the computational logic used to solve a full problem (i.e., the computational workload is distributed across multiples of these active silicon dies); 2) chiplets are packaged together as a monolithic unit on the same substrate; and 3) the programming model preserves the concept that these separate computational dies are a single monolithic unit (i.e., each chiplet is not exposed as a separate device to an application that uses the chiplets for processing computational workloads).

In various implementations, the CPU 205 is connected via a bus 240 to a system memory 230, such as a dynamic random access memory (DRAM). In various implementations, the system memory 230 can also be implemented using other types of memory including static random access memory (SRAM), nonvolatile RAM, and the like. In one implementation, system memory 230 includes data structures 235A-235N for storing data associated with interrupts. In the example shown, the structures are ring buffers 235A-N, with one ring buffer for each guest OS of system 200. In other words, each ring buffer 235A-N is assigned to one guest OS. In one implementation, each ring buffer 235A-N stores metadata associated with interrupts received from master interrupt controller (MIC) 255 for the corresponding guest OS. While structures 235A-235N are shown in the embodiment of FIG. 2 as ring buffers, other structures are possible and are contemplated. The interrupts are then processed in the order in which they are received from MIC 255.

In the illustrated implementation, the CPU 205 communicates with the system memory 230 and also the GPU chiplets 250 over bus 240 that is implemented as a peripheral component interconnect (PCI) bus, PCI-E bus, or other type of bus. However, some implementations of the system 200 includes the GPU chiplets 250 communicating with the CPU 205 over a direct connection or via other buses, bridges, switches, routers, and the like.

As illustrated, the CPU 205 includes a number of processes, such as executing one or more application(s) 210 to generate graphic commands and a user mode driver 220 (or other drivers, such as a kernel mode driver). In various implementations, the one or more applications 210 include applications that utilizes the functionality of the GPU chiplets 250, such as applications that generate work in the system 200 or an operating system (OS). An application 210 may include one or more graphics instructions that instruct the GPU chiplets 250 to render a graphical user interface (GUI) and/or a graphics scene. For example, the graphics instructions may include instructions that define a set of one or more graphics primitives to be rendered by the GPU chiplets 250.

In some implementations, the application 210 utilizes a graphics application programming interface (API) to invoke a user mode driver 220 (or a similar GPU driver). User mode driver 220 issues one or more commands to the array of one or more GPU chiplets for rendering one or more graphics primitives into displayable graphics images. Based on the graphics instructions issued by application 210 to the user mode driver 220, the user mode driver 220 formulates one or more graphics commands that specify one or more operations for GPU chiplets to perform for rendering graphics. In some implementations, the user mode driver 220 is a part of the application 210 running on the CPU 205. For example, the user mode driver 220 may be part of a gaming application running on the CPU 205. Similarly, a kernel mode driver (not shown) may be part of an operating system running on the CPU 205.

In the depicted implementation of FIG. 2, a communication link 260 (e.g., crosslink 260) connects the GPU chiplets 250 (i.e., GPU chiplets 250A through 250N) to each other. It is noted that the number of GPU chiplets in the chiplet array is a matter of design choice and may vary from implementation to implementation. In various implementations, the crosslink 260 includes an interconnect chip such as a high density crosslink (HDCL) die interposer or other similar technology for inter-chiplet communications. In one implementation, chiplet 250A includes MIC 255 which aggregates the interrupts generated across chiplets 250A-N. MIC 255 forwards the interrupts to CPU 205 to be processed by OS 215 and/or driver 220. More details on the operations of MIC 255 are provided throughout the remainder of the disclosure.

Figure 3:
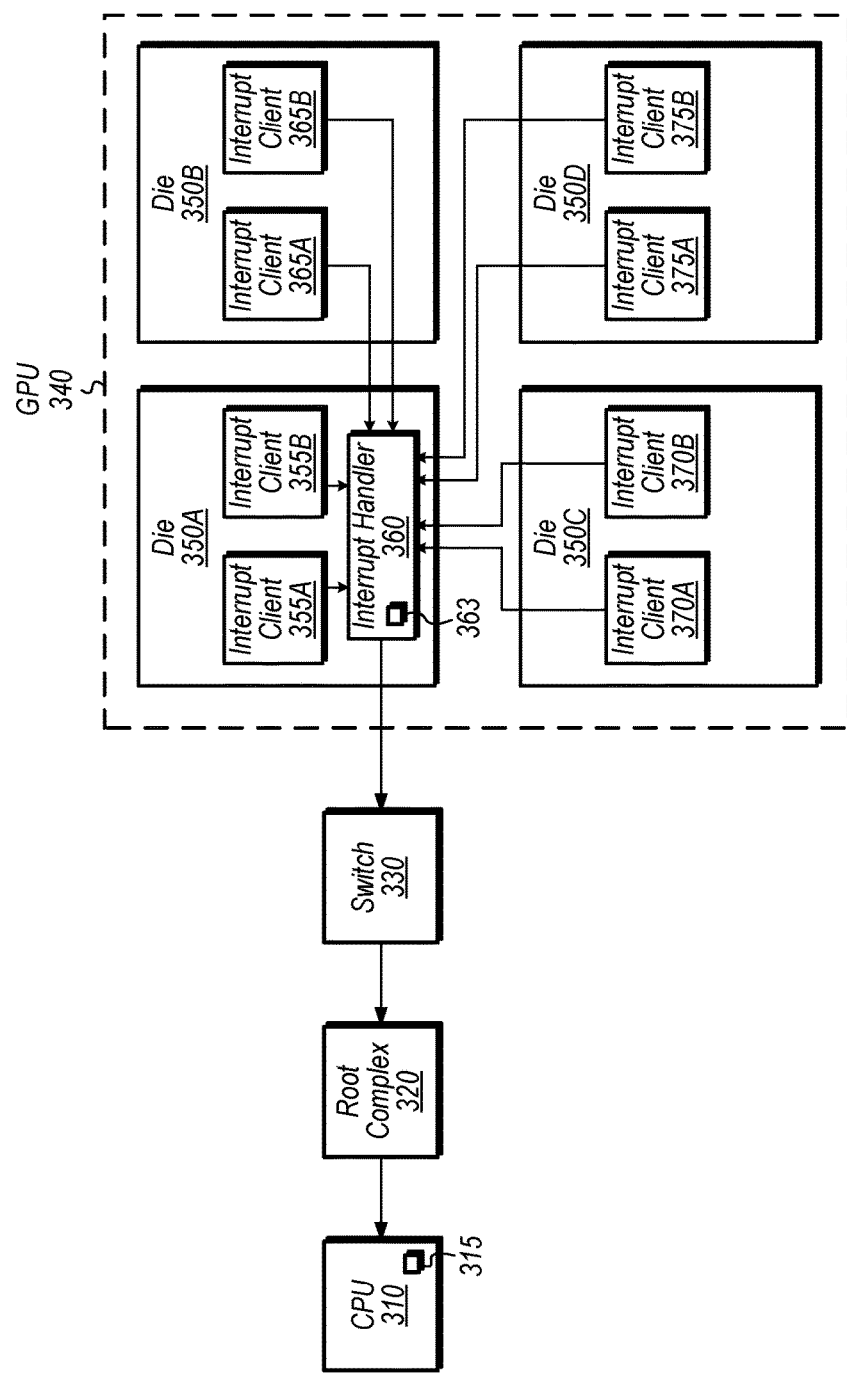
FIG. 3 is a block diagram of another implementation of a computing system.

Referring now to FIG. 3, a block diagram of another implementation of a computing system 300 is shown. As shown in FIG. 3, computing system 300 includes central processing unit (CPU) 310, root complex 320, switch 330, and graphics processing unit (GPU) 340. In one implementation, GPU 340 is a chiplet GPU that includes dies 350A-D which are representative of any number of semiconductor dies. It is noted that computing system 300 can include any number of other components (e.g., voltage regulator, memory device, network interface, peripheral device) which are not shown to avoid obscuring the figure. Computing system 300 can be any of the previously listed devices or systems, such as a computer, laptop, server, supercomputer, mobile device, or otherwise. Computing system 300 may also be incorporated into other devices or systems. Any of various other types of devices or systems are possible and are contemplated.

CPU 310 is representative of any type of CPUs or other types of processors. Depending on the implementation, CPU 310 can include multiple cores or a single core. In one implementation, CPU 310 executes the control software (e.g., the operating system (OS)) of system 300. The operating system controls the operation of system 300 to achieve the desired functionality of the system. The operating system may include and/or interact with various software programs such as drivers, control software, and so on. Root complex 320 connects switch 330 to CPU 310, as well as any other number and type of other components which are not shown in FIG. 3 to avoid obscuring the figure. In one implementation, switch 330 is a peripheral component interconnect express (PCIE) switch. In other implementations, switch 330 is any of various other types of switches.

As shown in FIG. 3, chiplet GPU 340 includes four dies 350A-D. In other implementation, chiplet GPU 340 can include other numbers (e.g., 8, 10, 16, 25, 32) of dies. As shown, each die 350A-D includes multiple interrupt clients. For example, die 350A include interrupt clients 355A-B, die 350B includes interrupt clients 365A-B, die 350C includes interrupt clients 370A-B, and die 350D includes interrupt clients 375A-B. While each die 350A-D is shown as including two interrupt clients, it should be understood that this is intended merely for illustrative purposes. In other implementations, each die 350A-D can include other numbers of interrupt clients. Also, it should be understood that different dies can have different numbers of interrupt clients. For example, a first die could have one interrupt client, a second die could have two interrupt clients, a third die could have three interrupt clients, and so on.

While each die 350A-D is shown as having multiple interrupt clients, only die 350A has an enabled interrupt handler 360 in one implementation. In some cases, dies 350B-D also have interrupt handlers but these interrupt handlers are disabled. For example, each die 350A-D is identical in one implementation, with only one of the dies having an enabled interrupt handler with the other dies having disabled interrupt handlers. The enabled interrupt handler would be the master interrupt handler for all dies.

Interrupt handler 360 serves as the centralized interrupt handler for chiplet GPU 340. It is noted that interrupt handler 360 can also be referred to herein as master interrupt handler 360 or centralized interrupt handler 360. Also, it is noted that the terms "interrupt handler" and "interrupt controller" may be used interchangeably herein. In one implementation, all interrupts from the clients on dies 350A-D are routed to interrupt handler 360. Then, when receiving an interrupt from any of the interrupt clients on dies 350A-D, interrupt handler 360 forwards the interrupt to control software executing on CPU 310. In one implementation, interrupt handler 360 generates a cookie to forward along with the interrupt data generated by the client. The cookie can include information such as the identifier (ID) of the client, the ID of the die, and/or other metadata.

In various implementations, master interrupt handler 360 includes mapping table 363 which maps hardware IDs to software IDs for interrupt initiators. In one implementation, mapping table 363 maps physical die IDs to logical die IDs for certain partition modes. The four-die chiplet GPU 340 arrangement shown in FIG. 3 corresponds to quarter-partition usage in one implementation. However, the four-die chiplet GPU 340 can also support dual-partition and single-partition modes, which would have two dies or all four dies corresponding to a single OS. In dual-partition and single-partition modes, Partition ID+Client ID are not enough to identify the interrupt initiator, in which case Partition ID+Die ID+Client ID is used to identify the interrupt initiator. In one implementation, CPU 310 includes mapping table 315 which maps software IDs to guest OS's for interrupt initiators. In one implementation, each software ID corresponds to a different guest operating system (OS). When CPU 310 receives an interrupt from interrupt handler 360, the interrupt includes a software ID which identifies the interrupt initiator using an ID recognizable by CPU 310. CPU 310 maps this software ID to an associated guest OS for the interrupt initiator who initiated this particular interrupt. CPU 310 can then process the interrupt in a manner consistent with the associated guest OS.

For example, in single-partition mode, only one OS exists. This OS owns all of the 4 physical dies, and the Partition ID (valid value: 0)+Die ID (valid value: 0, 1, 2, 3)+Client ID is used to identify the interrupt initiator. In dual-partition mode, each OS owns 2 physical dies (0/1 and 2/3 separately). But from the software point of view, each OS thinks it owns die 0/1. In dual-partition mode, remapping table 363 maps the physical Die ID (2/3) into logical Die ID (0/1), so that both OS's only see Die 0 and Die 1 logically. In this case, Partition ID (valid value: 0, 1) can be used to select Guest OS, while remapped Die ID (valid value: 0, 1)+Client ID can tell each OS the interrupt initiator information. In quarter-partition mode, each OS owns one physical die. From the software point of view, each OS thinks it owns die 0. Accordingly, in quarter-partition mode, mapping table 363 maps the physical Die ID (1/2/3) into logical Die ID (0), so that the OS's can only see die 0 logically. The Partition ID (valid value: 0, 1, 2, 3) can be used to select Guest OS, while the remapped Die ID (valid value: 0)+Client ID can tell each OS the interrupt initiator info.

Figure 4:
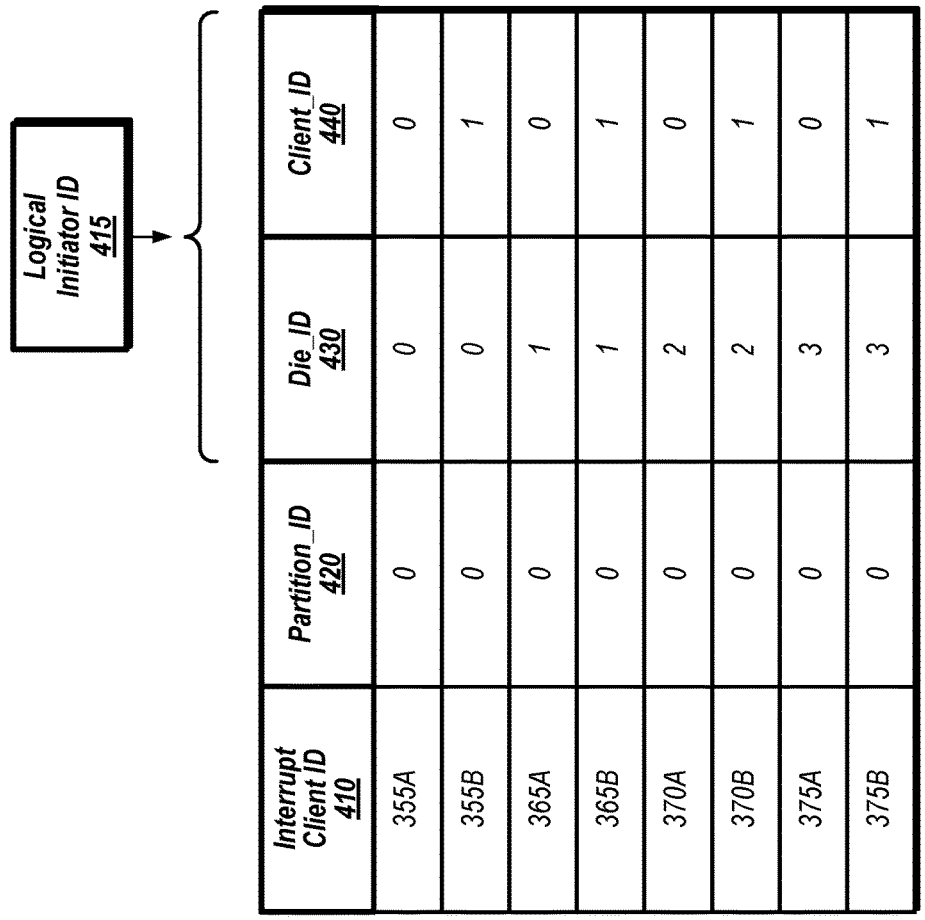
FIG. 4 is a single partition mode table for mapping interrupt clients to partition, die, and client IDs.

Turning now to FIG. 4, one implementation of a table 400 for mapping interrupt clients to partition, die, and client IDs when in single partition mode is shown. Table 400 applies to the interrupt client configuration of system 300 (of FIG. 3) for single partition mode. In single partition mode, only one OS exists with the OS owning all four physical dies. For the OS to know which client an interrupt comes from, the OS will use the die ID and the client ID. In single partition mode, the partition ID is superfluous since there is only a single partition. Accordingly, the interrupt handler (e.g., interrupt handler 360 of FIG. 3) will send the die ID and the client ID to the OS when forwarding interrupts to the OS. The combination of die ID field 430 and client ID field 440 is the logical initiator ID field 415 for single partition mode. In one implementation, table 400 is used by the interrupt handler to map physical initiator ID to logical initiator ID for single partition mode. Alternatively, in another implementation, rather than using a table, the interrupt handler uses a physical-to-logical mask to convert the physical ID received from the initiator into a logical ID usable by the CPU and/or OS. In other implementations, the interrupt handler uses other techniques to map the physical initiator ID to logical initiator ID.

Figure 5:
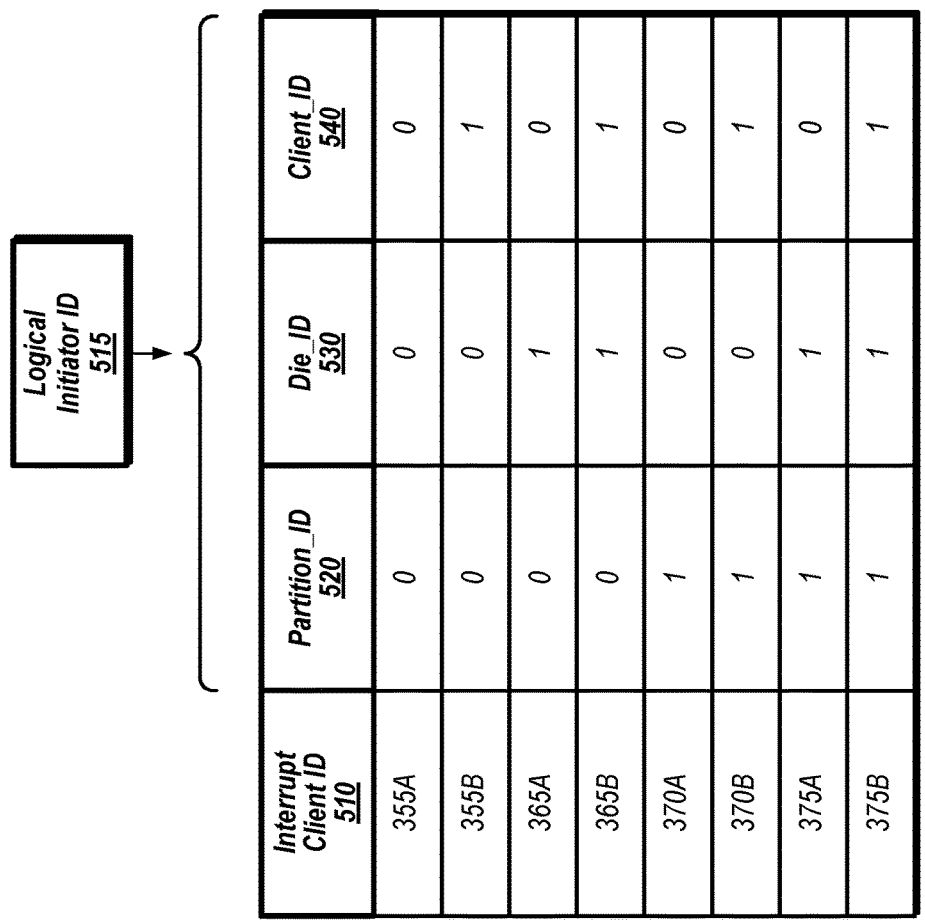
FIG. 5 is a dual partition mode table for mapping interrupt clients to partition, die, and client IDs.

Referring now to FIG. 5, one implementation of a table 500 for mapping interrupt clients to partition, die, and client IDs when in dual partition mode is shown. Table 500 applies to the interrupt client configuration of system 300 (of FIG. 3) for dual partition mode. In dual partition mode, two OSs exist, with each OS owning two physical dies. In one implementation, die 350A and die 350B are in partition 0, and die 350C and die 350D are in partition 1. Each OS owns one partition. In dual partition mode, a partition->logical die ID lookup maps physical die ID 0/1/2/3 to logical die ID 0/1/0/1. The partition ID is used to perform the guest OS lookup in dual partition mode. For the OS to know which client an interrupt comes from, the OS will use the die ID and the client ID. In dual partition mode, the partition ID identifies the OS, and the die ID and the client ID are used by the OS to identify the physical interrupt initiator. In one implementation, the combination of partition ID field 520, die ID field 530, and client ID field 540 is the logical initiator ID field 515 for dual partition mode. Alternatively, in another implementation, the interrupt handler uses the partition ID field 520 to identify the OS, and then sends the combination of die ID field 530 and client ID field 540 to the identified OS. In this implementation, logical initiator ID field 515 would be only the die ID field 530 and client ID field 540.

Figure 6:
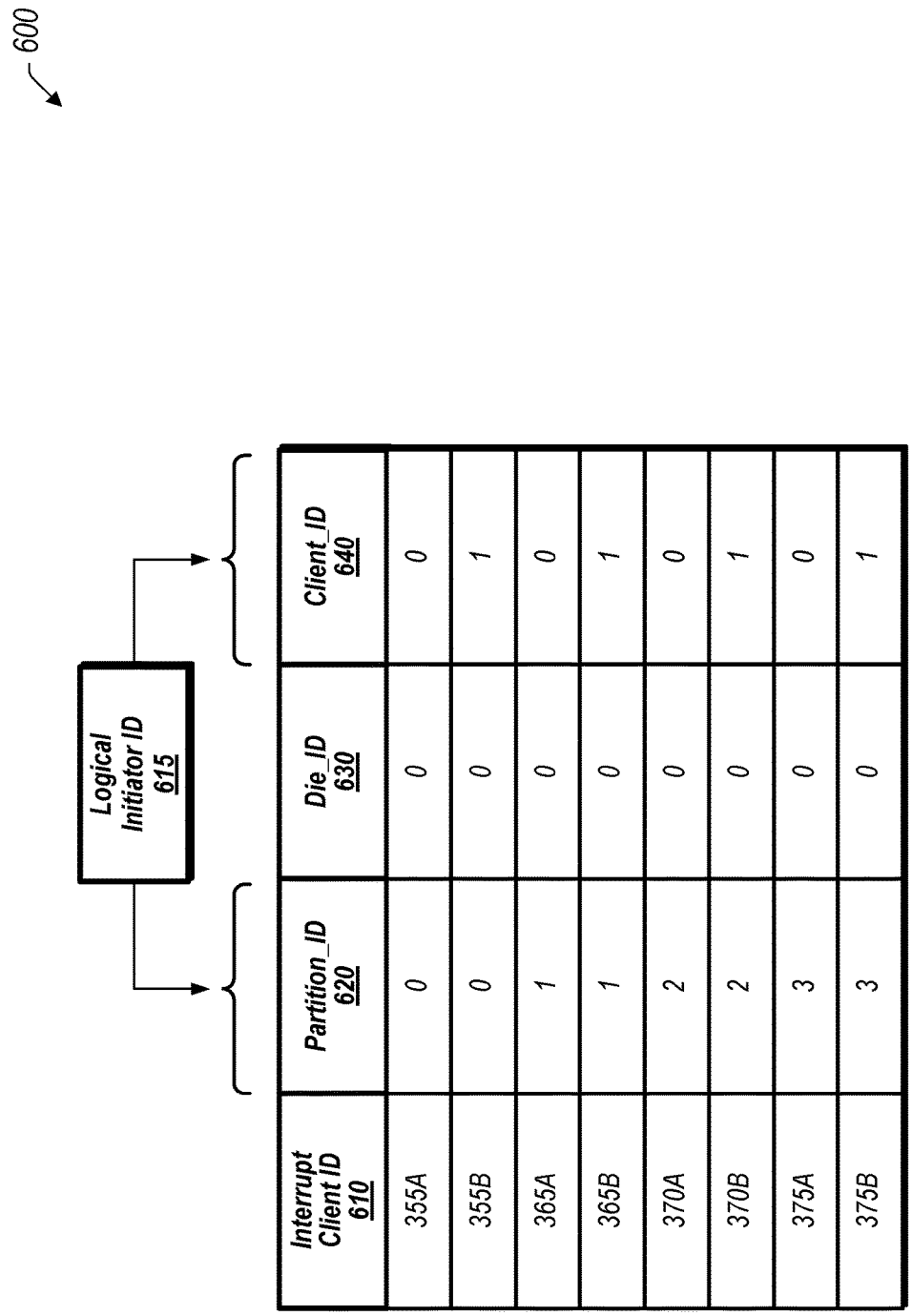
FIG. 6 is a quarter partition mode table for mapping interrupt clients to partition, die, and client IDs.

Turning now to FIG. 6, one implementation of a table 600 for mapping interrupt clients to partition, die, and client IDs when in quarter partition mode is shown. Table 600 applies to the interrupt client configuration of system 300 (of FIG. 3) for quarter partition mode. In quarter partition mode, four OSs exist, with each OS owning one physical die and corresponding to a single partition. In quarter partition mode, a partition->logical die ID lookup maps physical die ID 0/1/2/3 to logical die ID 0/0/0/0. The partition ID is used to perform the guest OS lookup in quarter partition mode. For the OS to know which client an interrupt comes from, the OS will use the client ID. In quarter partition mode, the partition ID identifies the OS, and the client ID is used by the OS to identify the physical interrupt initiator. In one implementation, the combination of partition ID field 620 and client ID field 640 is the logical initiator ID field 615 for quarter partition mode. Alternatively, in another implementation, the interrupt handler uses the partition ID field 620 to identify the OS, and then sends the client ID field 640 to the identified OS. In this implementation, logical initiator ID field 615 would be only the client ID field 640.

Turning now to FIG. 7, a diagram of one implementation of a master interrupt controller mapping table 700 is shown. In one implementation, the entries of table 700 are included in table 363 (of FIG. 3). In one implementation, the entries of table 700 include two fields: physical initiator identifier (ID) field 710 and logical initiator ID field 720. Any number of entries can be included in table 700, with entries shown for physical initiator IDs 710A-N and logical initiator IDs 720A-N. In other implementations, the entries of table 700 can include other numbers and/or types of fields and can be structured in other suitable manners. It is noted that the terms physical initiator and hardware initiator can be used interchangeably herein. It is also noted that the terms logical initiator and software initiator can be used interchangeably herein. Physical initiator ID field 710 and initiator ID field 720 can be encoded with any number of bits, with the number of bits varying according to the implementation, the partition mode, the configuration of the chiplet GPU, and so on.

In one implementation, when a master interrupt controller (e.g., master interrupt controller 360) receives an interrupt from a client, the master interrupt controller performs a lookup of table 700 with the physical initiator ID to determine the corresponding logical initiator ID. The master interrupt controller then forwards the logical initiator ID to software along with the interrupt. The master interrupt controller can discard the physical initiator ID from the interrupt or the master interrupt controller can include at least a portion of the physical initiator ID in the interrupt that is forwarded to software depending on the implementation.

Referring now to FIG. 8, a diagram of one implementation of a CPU mapping table 800 is shown. In one implementation, the entries of table 800 are included in table 315 (of FIG. 3). In one implementation, the entries of table 800 include two fields: logical initiator ID field 810 and guest OS ID field 820. Any number of entries can be included in table 800, with entries shown for logical initiator IDs 810A-N and guest OS IDs 820A-N. In other implementations, the entries of table 800 can include other numbers and/or types of fields and can be structured in other suitable manners. Logical initiator ID field 810 and guest OS ID field 820 can be encoded with any numbers of bits depending on the implementation.

In one implementation, when control software (e.g., OS 215, driver 220 of FIG. 2) receives an interrupt from a client via a master interrupt controller, the control software performs a lookup of table 800 with the logical initiator ID to determine the corresponding guest OS ID. The control software can then service the interrupt in accordance with the appropriate guest OS protocol.

Turning now to FIG. 9, one implementation of a method 900 for operating a centralized interrupt controller for multiple semiconductor dies is shown. For purposes of discussion, the steps in this implementation and those of FIG. 10-13 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900 (and methods 1000-1300).

A centralized interrupt controller receives a plurality of interrupts from a plurality of interrupt sources which are located on a plurality of semiconductor dies (block 905). For each received interrupt, the interrupt controller determines which source generated the interrupt (block 910). In one implementation, the interrupt controller maintains a mapping table (e.g., mapping table 363 of FIG. 3) which maps physical initiator IDs to logical initiator IDs. In this implementation, the interrupt controller retrieves the physical initiator ID from a received interrupt and performs a lookup of the table to determine to which logical initiator ID the retrieved physical initiator ID maps. In other implementations, the interrupt controller uses other techniques to determine the source that generated a given interrupt.

Next, for each interrupt, the interrupt controller forwards the interrupt along with an indication of the source to a processor (block 915). Then, the processor processes the interrupt and conveys a response to the interrupt controller when processing of the interrupt has been completed (block 920). Next, the interrupt controller forwards the completion indication to the interrupt source (block 925). After block 925, method 900 ends.

Figure 10:
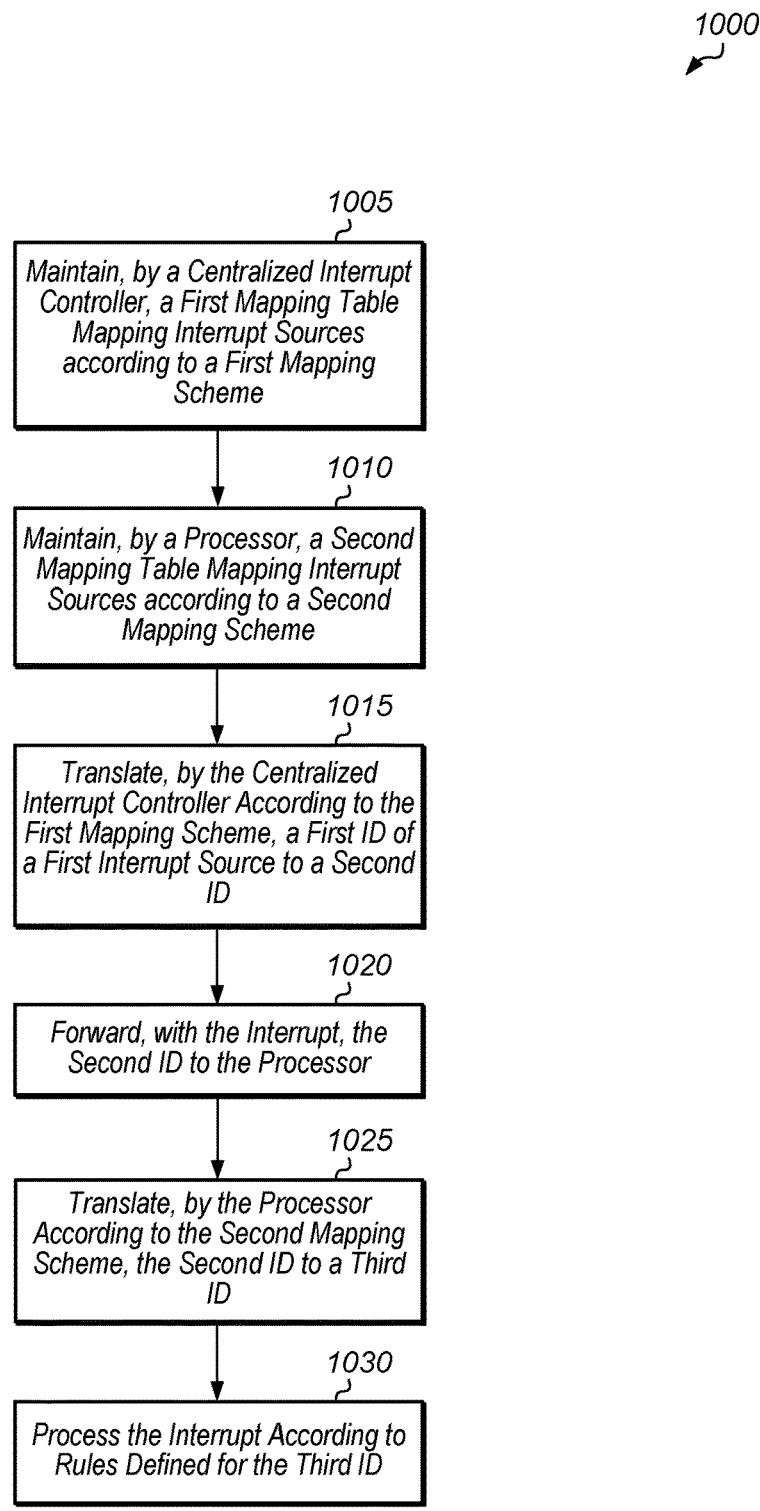
FIG. 10 is a generalized flow diagram illustrating one implementation of a method for translating interrupt source IDs according to multiple mapping schemes.

Referring now to FIG. 10, one implementation of a method 1000 for translating interrupt source IDs according to multiple mapping schemes is shown. A centralized interrupt controller maintains a first mapping table (e.g., table 363 of FIG. 3) mapping interrupt sources according to a first mapping scheme (block 1005). A processor maintains a second mapping table (e.g., table 315) mapping interrupt sources according to a second ID scheme (block 1010). The centralized interrupt controller translates, according to the first mapping scheme, a first ID of a first interrupt source to a second ID (block 1015). The centralized interrupt controller forwards, with the interrupt, the second ID to the processor (block 1020). The processor translates, according to the second mapping scheme, the second ID to a third ID (block 1025). Next, the processor processes the interrupt according to rules defined for the third ID (block 1030). After block 1030, method 1000 ends.

Figure 11:
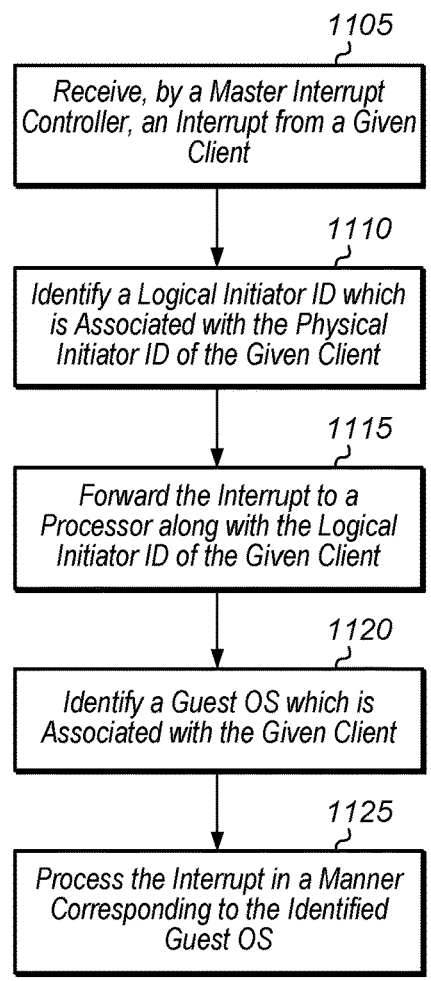
FIG. 11 is a generalized flow diagram illustrating one implementation of a method for translating interrupts from clients to guest OS's.

Turning now to FIG. 11, one implementation of a method 1100 for translating interrupts from clients to guest OS's is shown. A master interrupt controller receives an interrupt from a given client (block 1105). It is assumed for the purposes of this discussion that the master interrupt controller is connected to (either directly or indirectly) and receives interrupts from multiple different clients. Next, the master interrupt controller identifies a logical initiator ID which is associated with the physical initiator ID of the given client (block 1110). In one implementation, the master interrupt controller performs a lookup, with a physical initiator ID of the given client, of a mapping table (e.g., table 363 of FIG. 3) to identify the logical initiator ID of the given client. Then, the master interrupt controller forwards the interrupt to a processor (e.g., CPU 310) along with the logical initiator ID of the given client (block 1115). Next, the processor identifies a guest OS which is associated with the given client (block 1120). In one implementation, the master interrupt controller performs a lookup, with a logical initiator ID of the given client, of a mapping table (e.g., table 315) to identify the guest OS associated with the partition. Then, the processor processes the interrupt in a manner corresponding to the identified guest OS (block 1125). After block 1125, method 1100 ends.

Figure 12:
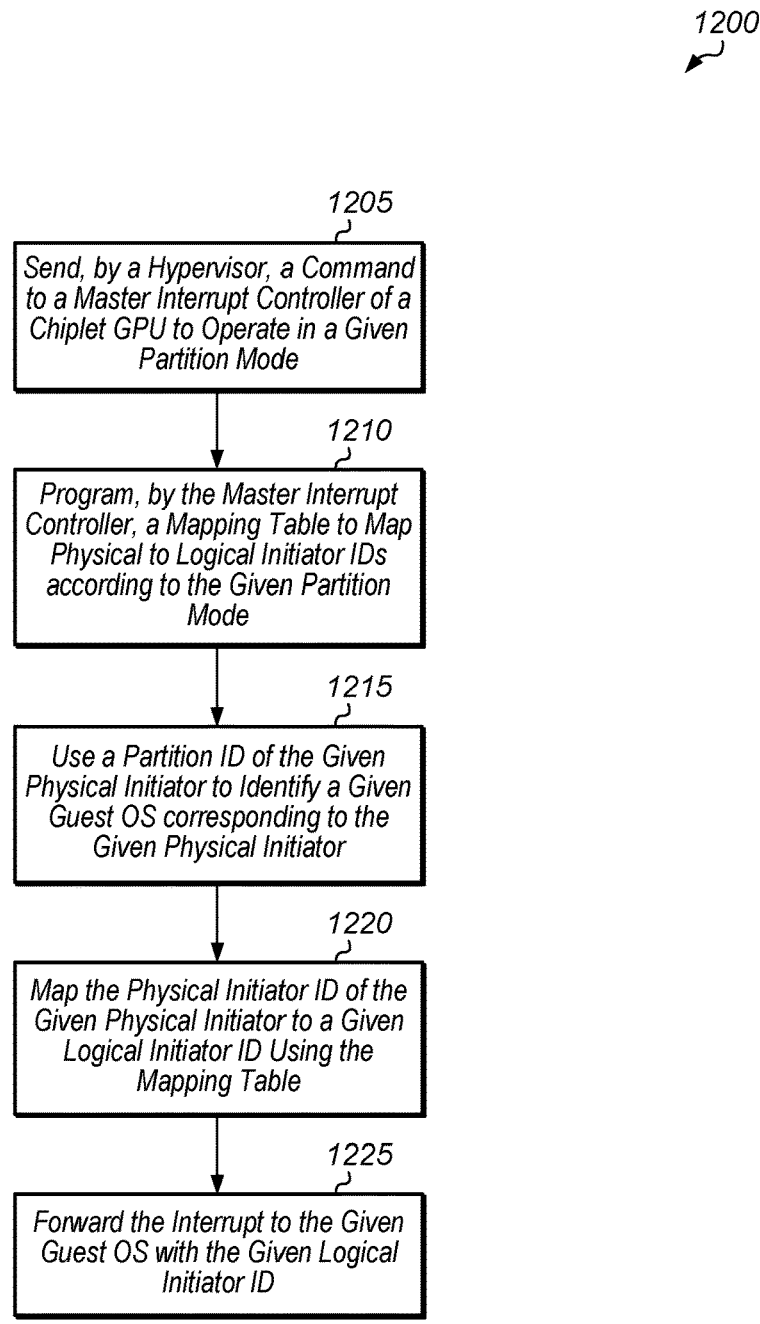
FIG. 12 is a generalized flow diagram illustrating one implementation of a method for configuring a chiplet GPU to operate in a particular partition mode.

Referring now to FIG. 12, one implementation of a method 1200 for configuring a chiplet GPU to operate in a particular partition mode is shown. A hypervisor sends a command to a master interrupt controller of a chiplet GPU to operate in a given partition mode (block 1205). In response to receiving the command, the master interrupt controller programs a mapping table to map physical to logical initiator IDs according to the given partition mode (block 1210). FIG. 4-6 provide examples of configuring a mapping table according to different partition modes. Alternatively, in another implementation, the master interrupt controller programs a mask for converting physical to logical initiator IDs according to the given partition mode.

In response to receiving an interrupt from a given physical initiator, the master interrupt controller uses a partition ID of the given physical initiator to identify a given guest OS corresponding to the given physical initiator (block 1215). Next, the master interrupt controller maps, using the mapping table, the physical initiator ID of the given physical initiator to a given logical initiator ID (block 1220). Then, the master interrupt controller forwards the interrupt to the given guest OS with the given logical initiator ID (block 1225). After block 1225, method 1200 ends.

Figure 13:
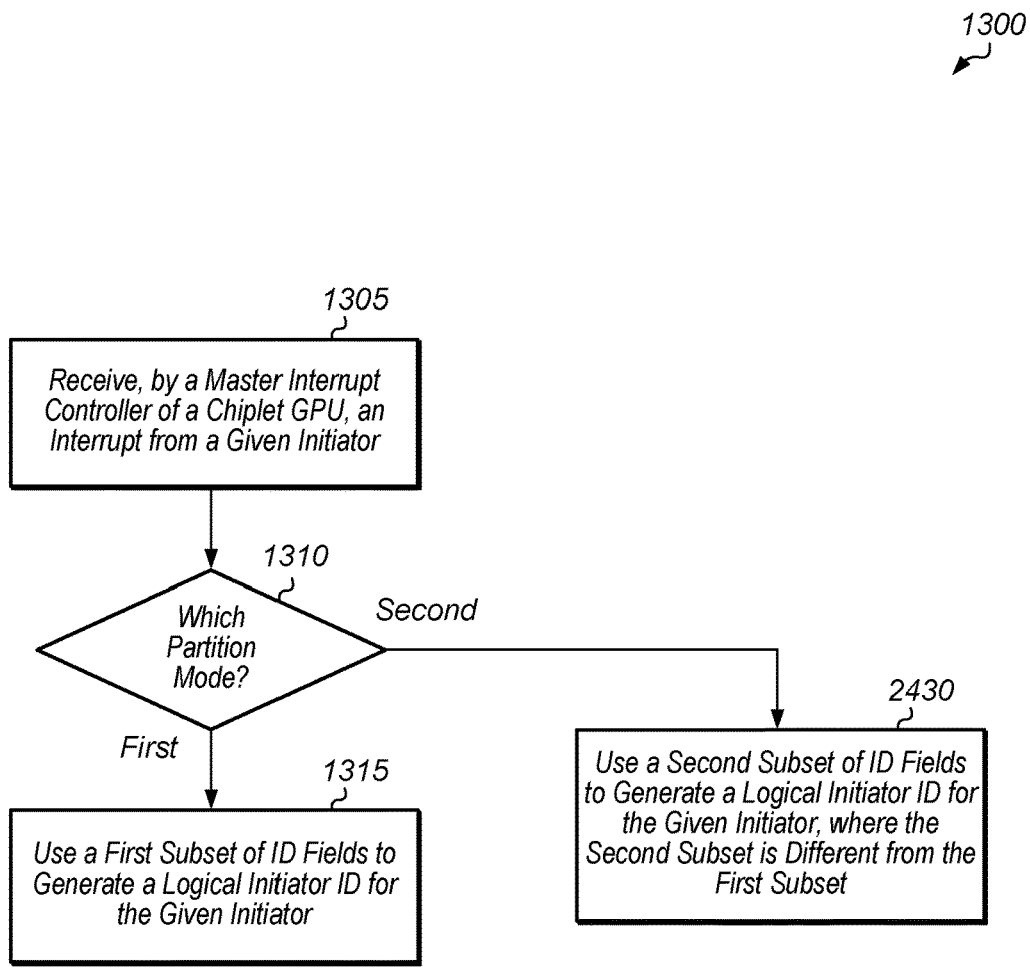
FIG. 13 is a generalized flow diagram illustrating one implementation of a method for mapping physical to logical initiator IDs for different partition modes.

Turning now to FIG. 13, one implementation of a method 1300 for mapping physical to logical initiator IDs for different partition modes is shown. A master interrupt controller, of a chiplet GPU, receives an interrupt from a given initiator (block 1305). If the chiplet GPU is in a first partition mode (conditional block 1310, "first" leg), then the master interrupt controller uses a first subset of ID fields to generate a logical initiator ID for the given initiator (block 1315). For example, in one implementation, if the chiplet GPU is in single partition mode, the master interrupt controller uses the combination of the Die ID and Client ID as the logical initiator ID while ignoring the Partition ID of the given initiator. Otherwise, if the chiplet GPU is in a second partition mode (conditional block 1310, "second" leg), then the master interrupt controller uses a second subset of ID fields to identify a logical initiator ID for the given initiator, where the second subset is different from the first subset (block 1320). For example, in one implementation, if a 4-die chiplet GPU is in quarter partition mode, the master interrupt controller uses the combination of the Partition ID and Client ID as the logical initiator ID while ignoring the Die ID of the given initiator. After blocks 1315 and 1320, method 1300 may end. It is noted that method 1300 describes the example when there are two different partition modes. However, it should be understood that in other implementations, method 1300 can be altered to be performed for more than two different types of partition modes. In these implementations, conditional block 1310 will have more than two legs, and the subset that is selected will be based on the specific partition mode.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a master interrupt controller, in a first semiconductor die of a plurality of semiconductor dies on a substrate, comprising circuitry configured to:
  receive, via a communication link, interrupts generated by at least:
   a first interrupt source in the first semiconductor die; and
   a second interrupt source in a second semiconductor die of the plurality of semiconductor dies;
  in response to receiving a given interrupt, determine which of the first interrupt source and the second interrupt source generated the given interrupt; and convey the given interrupt, with an indication of which source generated the given interrupt, to a processor for handling by the processor.

2. The apparatus as recited in claim 1, wherein the first semiconductor die has a first identifier (ID) and wherein the second semiconductor die has a second ID different from the first ID.

3. The apparatus as recited in claim 1, wherein the second semiconductor die comprises an interrupt controller that is disabled.

4. The apparatus as recited in claim 1, wherein the master interrupt controller is configured to map physical initiator IDs to logical initiator IDs.

5. The apparatus as recited in claim 1, wherein each of the first semiconductor die and the second semiconductor die is a chiplet.

6. The apparatus as recited in claim 1, wherein the first interrupt source has a first physical initiator identifier (ID) and the second interrupt source has a second physical initiator ID different from the first physical initiator ID.

7. The apparatus as recited in claim 1, wherein the processor comprises a mapping table which maps logical initiator IDs to guest operating system IDs.

8. A method comprising:
receiving, by a master interrupt controller in a first semiconductor die of a plurality of semiconductor dies on a substrate, interrupts from at least a first interrupt source in the first semiconductor die and a second interrupt source in a second semiconductor die;
determining which of the first interrupt source and the second interrupt source generated a given interrupt responsive to receiving the given interrupt; and
conveying the given interrupt, along with an indication of which source generated the given interrupt, to a processor for handling by the processor.

9. The method as recited in claim 8, wherein the first semiconductor die has a first identifier (ID) and wherein the second semiconductor die has a second ID different from the first ID.

10. The method as recited in claim 9, further comprising sending, by the first interrupt source, the first ID to the master interrupt controller with interrupts generated by the first interrupt source.

11. The method as recited in claim 8, further comprising mapping, by the master interrupt controller, physical initiator IDs to logical initiator IDs.

12. The method as recited in claim 11, further comprising determining, by the master interrupt controller, a logical initiator ID of a source which generates an interrupt by accessing a mapping table with a physical initiator ID received with the interrupt.

13. The method as recited in claim 8, wherein the first semiconductor die includes a third interrupt source, wherein the first interrupt source has a first identifier (ID), wherein the second interrupt source has a second ID different from the first ID, and wherein the third interrupt source has a third ID different from the second ID and the first ID.

14. The method as recited in claim 8, further comprising:
maintaining a mapping table which maps logical initiator IDs to guest operating system IDs; and
determining a guest operating system corresponding to the given interrupt by accessing the mapping table with a given logical initiator ID corresponding to the given interrupt.

15. A system comprising:
a plurality of semiconductor dies on a substrate; and
a master interrupt controller comprising circuitry configured to:
receive interrupts from a first interrupt source in a first semiconductor die of the plurality of semiconductor dies and a second interrupt source in a second semiconductor die of the plurality of semiconductor dies;
responsive to receiving a given interrupt, determine which of the first interrupt source and the second interrupt source generated the given interrupt; and
convey the given interrupt, along with an indication of which source generated the given interrupt, to a processor for handling by the processor.

16. The system as recited in claim 15, wherein the first semiconductor die has a first identifier (ID) and wherein the second semiconductor die has a second ID different from the first ID.

17. The system as recited in claim 16, wherein the first interrupt source sends the first ID to the master interrupt controller with interrupts generated by the first interrupt source.

18. The system as recited in claim 15, wherein the master interrupt controller is configured to map physical initiator IDs to logical initiator IDs.

19. The system as recited in claim 15, wherein the first semiconductor die and a second semiconductor die appear to a programming model as a single monolithic unit.

20. The system as recited in claim 15, wherein the first semiconductor die includes a third interrupt source, wherein the first interrupt source has a first identifier (ID), wherein the second interrupt source has a second ID different from the first ID, and wherein the third interrupt source has a third ID different from the second ID and the first ID.

* * * * *